(No Model.)
W. H. STINE.
TENSION DEVICE FOR GRAIN BINDERS.
No. 394,891. Patented Dec. 18, 1888.
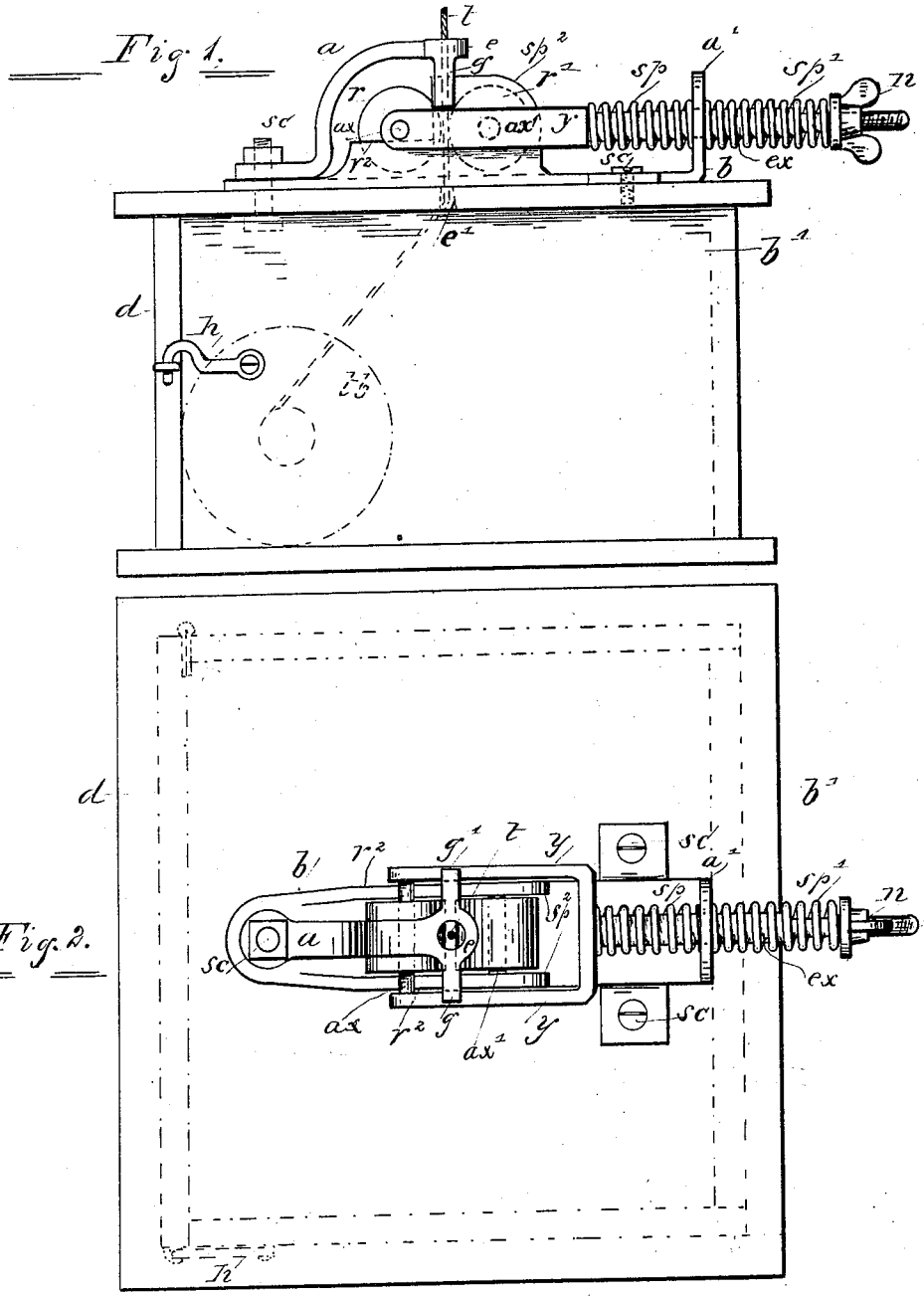

UNITED STATES PATENT OFFICE.

WILLIAM H. STINE, OF MARIETTA, INDIANA.

TENSION DEVICE FOR GRAIN-BINDERS.

SPECIFICATION forming part of Letters Patent No. 394,891, dated December 18, 1888.

Application filed June 4, 1888. Serial No. 276,157. (No model.)

*To all whom it may concern:*

Be it known that I, WILLIAM H. STINE, a resident of the town of Marietta, in the county of Shelby and State of Indiana, have invented certain new and useful Improvements in Tension Devices for Grain-Binders, of which the following is a specification.

My improvement relates to tension devices for grain-binders in which friction-rollers operate conjointly; and the object of my improvement is to prevent the frequent breaking and irregular tension of uneven or knotted twine in the process of binding. I attain these objects by the mechanism illustrated in the following drawings.

Figure 1 is a side view of the device in a horizontal position, and Fig. 2 is a top view.

Similar letters refer to similar parts throughout the several views.

The base $b$, the rests $r^2$, the supports $sp^2$, and arm $a'$ constitute the frame-work of the device, which is fastened to the top of the box $b'$ by bolts or screws $sc$. The rollers $r$ $r'$ rotate on their respective axles $ax$ $ax'$, between the supports $sp^2$ and the arms of the yoke $y$. The yoke $y$ is held in position by the arm $a'$; the supports $sp^2$, the guides $g$ $g'$, and the axle $ax$ on the rests $r^2$. The arm $a$ is attached to the base $b$ and curves upward and over the roller $r$, the eye $e$ being vertical to the line of contact between the rollers $r$ $r'$ and the angular guides $g$ $g'$, resting laxly on the arms of the yoke on the outward sides of the supports $sp^2$. The box $b'$ is the receptacle of the twine-ball $tb$, and is provided with a door, $d$, held by the hook $h$. The thread $t$ passes from the ball upward through the eye $e'$, between the rollers $r$ $r'$, through the eye $e$ of the arm $a$, and thence through the usual guides to the needle of the binder. The extension $ex$ of the yoke $y$ is furnished with springs $sp$ $sp'$ and a nut, $n$. The spring $sp$ encircles said extension, with one of its ends resting against the branches of the yoke and its other against the arm $a'$, and expanding forces back the yoke $y$ with the roller $r$, forming a space between the rollers for the purpose of threading. The spring $sp$ also encircles said extension, with one of its ends resting against the arm $a'$ and its other end against the nut $n$, and retaining sufficient elasticity under pressure by the nut $n$ admits a movement of the yoke $y$, and the roller $r$ conforming the space between the rollers to knots and irregularities of the thread. The nut $n$ is placed and moves on the threaded end of said extension, and is used for the purpose hereinafter indicated. By compressing the springs in the use of the nut $n$, the roller $r$ is drawn to the roller $r'$, pressing the thread $t$ between them with the force necessary to produce the proper tension, the springs affording sufficient elasticity to allow knots or enlargements of the thread to pass without unnecessary straining in the process of binding. By relaxing the springs the rollers are parted, so as to allow an easy passage in threading.

This device may be used in any position and applied to any binder now in use.

What I claim, and desire to secure by Letters Patent of the United States, is—

The combination, in a tension device, of the box $b'$, the eye $e'$ in the base $b$, the rests $r^2$, the supports $sp^2$, forming bearings for the axle $ax'$ of the roller $r'$, the arm $a'$, forming a bearing for the extension $ex$ of the yoke $y$, the rollers $r$ $r'$, the axles $ax'$, mounted in stationary bearings $ax$, mounted in sliding bearings controlled by the rests $r^2$ of the base $b$, the guides $g$ $g'$ of the arm $a$, and the spring-controlled extension of the yoke $y$, the yoke $y$ encompassing the supports $sp^2$, in which yoke the roller $r$ is mounted at one end and having an extension, $ex$, at the other, the nut $n$, the springs $sp$, located on the extension $ex$ of the yoke $y$ between its fork and the arm $a'$, $sp'$ placed on said extension between the arm $a'$ and the nut $n$ on the extension $ex$, the arm $a$, fastened to the base $b$ at its lower end, with the eye $e$, and guides $g$ $g'$ at its upper end, all substantially as above described, and for the purpose set forth.

WILLIAM H. STINE.

Witnesses:
 ADAM MUTZ,
 AMOS T. DAVIS.